Figure 1:
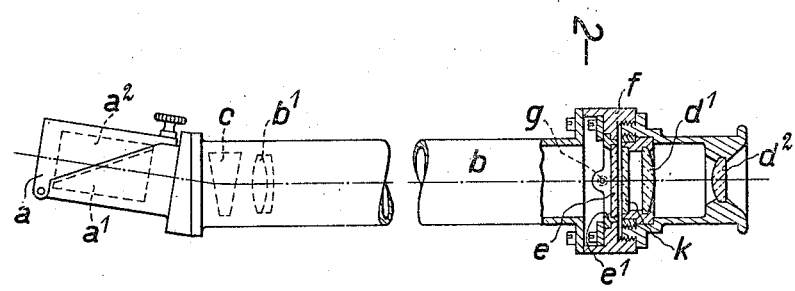

Patented Jan. 13, 1925.

1,522,639

UNITED STATES PATENT OFFICE.

FRITZ LÖWE, OF JENA, GERMANY, ASSIGNOR TO THE FIRM OF CARL ZEISS, OF JENA, GERMANY.

REFRACTOMETER FOR LIQUIDS.

Application filed December 7, 1921. Serial No. 520,687.

*To all whom it may concern:*

Be it known that I, FRITZ LÖWE, a citizen of the German Empire, residing at Jena, Germany, have invented new and useful Refractometers for Liquids, of which the following is a specification.

The present invention relates to refractometers for examining liquids, the refractive index of which is greatly dependent on the temperature so that, when determining the refractive index, the temperature must always be taken into consideration as well. Hitherto, when measuring the refractive indices of such liquids, it was necessary, on the one hand, to determine with the aid of the refractometer proper the present value of the refractive index, on the other hand with the aid of a thermometer, connected with the refractometer, the temperature of the sample of liquid used and then it was possible to ascertain by computation or with the aid of tables the value of the refractive index corresponding to a certain, definite standard temperature. For technical measurements the refractive index itself is in that case frequently of inferior importance because the light-refracting power is often only used for determining therefrom certain other properties of the liquid which according to a law are connected with the light-refracting power. In most cases it concerns solutions with which the percentage of dissolved substances is to be ascertained by means of the refractive index, e. g. the percentage of dry substance in the evaporation of sugar juices. Although in refractometers the scale of the refractive indices has already been numbered for such purposes directly according to the percentages of solution or the like to be determined, also in that case a conversion was always necessary after the measurement had been effected, in order to compensate the influence of temperature. The object of the present invention is to combine at once the said subsequent rectification of the refractive index measured or of a value connected therewith for a uniform temperature so as to supersede any further computation or use of tables. This is achieved by providing the one member of the reading device of the refractometer, scale or pointer, with an adjusting device which admits of directly taking into consideration the influence of temperature, so that with each measurement it is only necessary to first adjust the said member according to the temperature in order that thereupon the refractive index corresponding to the uniform comparison temperature or the value otherwise looked for can be easily read off. If the member provided with the adjusting device be the movable member of the reading device, an adjustment of the said member relatively to its movable carrier has to be rendered possible by the adjusting device.

This idea may be realized in a different way in each of the constructions of refractometers known already. As a rule, for determining the refractive index of liquids there is used the boundary line of the total reflection arising at a prism surface covered by the liquid. In that case the reading device may, as is well known, be either disposed laterally to the telescope serving for the observation of the boundary line, or in the field of the ocular. In all these cases the invention can be embodied in a simple manner by displaceably disposing the reading scale or the pointer in the scale-direction and by connecting this displaceable member, e. g. with an adjusting screw which admits of imparting to the same for any temperature a certain, definite position relatively to its carrier. In that case it is, of course, assumed that this additional displacement required for any temperature remains stationary over the whole measuring range of the instrument. Another possibility consists in the insertion of a deflecting device into the path of rays between the prism surface and the observing eye, which deflecting device admits of deflecting the boundary line by a definite amount, corresponding to the temperature at any one time. Also in that case there should be made a similar assumption as in the previous arrangement. A constructional form of the invention, independent of these restrictions and applicable to any construction of refractometers, may be obtained by fixing the connection between refractive index, temperature and the comparison value looked for in the shape of a diagram with a number of curves and by connecting this diagram with the reading pointer of the refractometer in such a manner that both diagram and pointer can be adjusted relatively to each other, perpendicularly to the axis of the co-ordinates of the refractive indices according to the temperature at any one time. Also in that case it is only necessary to set the pointer, prior to every reading, at the corresponding line of temperature in order to readily obtain the comparison value looked for by means of the position of the pointer within the diagram. As a rule, as diagram co-ordinates besides the refractive indices there will be chosen the temperatures so that, e. g. with solutions the diagram may be shown as a number of curves of the same percentage which, after the setting of the temperature and the refractive index, directly admit of reading off the present percentage of the solution. It is immaterial for the invention which of the two parts, diagram or pointer is in that case rigidly disposed and which is movable. Besides, according to the further construction of the instrument, the reading device may be either disposed outside the telescope serving for the observation or inserted into the field of the ocular, i. e. it may be carried out after the manner of a micrometer ocular. In the latter case there results a particularly convenient manipulation if also the temperatures can be read off in the field of the ocular because with this arrangement both the adjustment of the temperature and the adjustment for the value available for the refractive index can be observed in the same ocular. If in that case a refractometer having a rigid telescope for observing the boundary line of the total reflexion be concerned, viz. an arrangement in which the boundary line itself serves as a pointer, the diagram will suitably be used as the movable member of the reading device, i. e. it will be displaceably disposed perpendicularly to the direction in which the boundary line travels with a variable refractive index, so that in conjunction with the boundary line a single firm line running perpendicularly to the tangent of the boundary line suffices as a reading mark.

Figure 2:
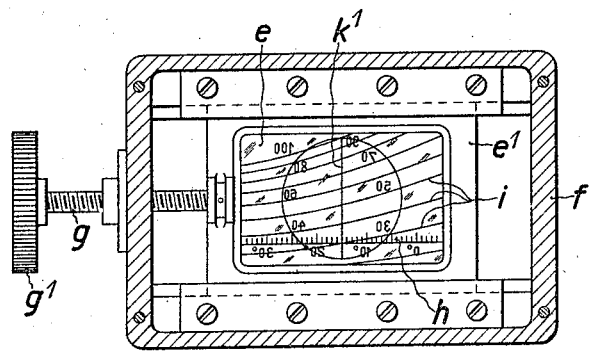

In the annexed drawing the invention is illustrated by a constructional example of the last described kind in which all adjustments as well as the reading of the value looked for take place in the field of the ocular. It is assumed that a refractometer for solutions of certain, definite substances is concerned which admits of directly reading off the percentage of the solution and the measuring range of which is comparatively small so that the totally reflecting prism surface can be rigidly connected with the observation telescope and that the field of the ocular embraces the entire measuring range. Fig. 1 shows a longitudinal view of the instrument in which the ocular parts are drawn in section, Fig. 2 shows on a double scale a cross section of the instrument on the line 2—2 of Fig. 1.

A prism system $a^1$, $a^2$ corresponding to the usual arrangement by Abbe is fastened with its folding casing $a$ at the front of a telescope $b$. Between the prism system $a^1$, $a^2$ and the telescope objective indicated by a lens system $b^1$ there is inserted a prism $c$ by which the achromatising of the boundary line is effected in a well-known way. The ocular system of the telescope is represented by two lenses $d^1$ and $d^2$. Directly in front of the focal plane of the objective $b^1$ there is a glass disc $e$ which is fixed in a rectangular frame $e^1$, and which is displaceable with the latter perpendicularly to the direction in which with a variable refractive index there travels the boundary line of the total reflection arising at the prism $a^1$. The frame $e^1$ is capable of laterally sliding for this purpose in guides which are provided for within a rectangular casing $f$ screwed to the telescope casing and of being adjusted by means of a screw $g$ having a milled head $g^1$. The glass disc $e$ carries on the back, on the one hand, a temperature scale $h$ running parallel to its direction of displacement and, on the other hand, a number of curves $i$ which connect the points of like percentage with each other in the diagram formed according to the temperature and refractive index. Close behind the glass disc $e$ another fixed glass disc $k$ has been provided for, which possesses on its front surface in the centre of the field of view a straight line $k^1$ running perpendicularly to the temperature scale. This line $k^1$ is simultaneously perpendicular to the boundary line and forms along with the same crossed threads serving as a reading mark at any one time.

When using the instrument a few drops of the solution to be examined are first brought in a known manner between the prisms $a^1$ and $a^2$. Hereupon the glass disc $e$ is so adjusted with the aid of the milled head $g^1$ that the fixed, straight line $k^1$ of the field of the ocular indicates on the temperature scale $h$ the temperature of the solution introduced, which has been further determined in an optional manner. Thereby the number of curves $i$ is simultaneously brought into the position, corresponding to the temperature, opposite the reading line $k^1$; so that from the position of the point of intersection of the reading line $k^1$ with the boundary line within the diagram there results directly the percentage applied to the uniform comparison temperature.

I claim:

1. A refractometer for determining a property of a liquid upon which depends the refractive index of this liquid, containing a prism system with a surface adapted to totally reflect rays which have entered the prism, a telescope so disposed behind the prism system as to be capable of receiving rays passed through the said prism, a reading device, containing a reference line and a diagram, which diagram consists of a number of curves, each curve corresponding to a given percentage of the substance, whose presence in the liquid is to be quantitatively determined, the said reading device admitting of reading off the position of the extreme rays which are yet totally reflected at the said surface, the reference line and the diagram being adjustable relatively to each other, perpendicularly to the axis of the co-ordinates of the refractive indices, a scale divided according to temperatures, an adjusting screw for displacing the reference line relatively to the said temperature-scale.

2. A refractometer for determining the percentage of dry substance in sugar juices, containing a prism system with a surface adapted to totally reflect rays which have entered the prism, a telescope so disposed behind the prism system as to be capable of receiving rays passed through the said prism, a reading device, containing a reference line and a diagram, which diagram consists of a number of curves, each of these showing for a value, proper to the respective curve, the connection which exists between the percentage of dry substance, temperature and the refractive index of the sugar juice, the said reading device admitting of reading off the position of the extreme rays which are yet totally reflected at the said surface, the reference line and the diagram being adjustable relatively to each other, perpendicularly to the axis of the co-ordinates of the refractive indices, a scale divided according to temperatures, an adjusting screw for displacing the reference line relatively to the said temperature-scale.

3. In a refractometer for determining a property of a liquid upon which depends the refractive index of this liquid, a prism system with a surface adapted to totally reflect rays which have entered the prism, a telescope so disposed behind the prism system as to be capable of receiving rays passed through the said prism and containing an ocular, a fixed reading off line running in the focal plane of this ocular in a plane perpendicular to the said reflecting surface and a glass plate also disposed in the said focal plane and displaceable in this plane perpendicularly to the said reading off line, the said glass plate being provided with a number of curves, each of these showing for a value, proper to the respective curve, the connection which exists between the temperature and the refractive index, and with a rectilinear temperature scale disposed transversely to the said reading off line.

FRITZ LÖWE.

Witnesses:
PAUL KRÜGER,
FRITZ LANDER.